M. TILHET.
VARIABLE SPEED PEDAL GEAR FOR CYCLES, MOTOCYCLES, &c.
APPLICATION FILED MAR. 21, 1910.

993,738.

Patented May 30, 1911.

2 SHEETS—SHEET 1.

M. TILHET.
VARIABLE SPEED PEDAL GEAR FOR CYCLES, MOTOCYCLES, &c.
APPLICATION FILED MAR. 21, 1910.

993,738.

Patented May 30, 1911.

2 SHEETS—SHEET 2.

Witnesses
M. W. Darg
L. A. Price

Inventor
Maurice Tilhet,
By Wm. E. Boulter,
Attorney

UNITED STATES PATENT OFFICE.

MAURICE TILHET, OF PARIS, FRANCE.

VARIABLE-SPEED PEDAL-GEAR FOR CYCLES, MOTOCYCLES, &c.

993,738. Specification of Letters Patent. Patented May 30, 1911.

Application filed March 21, 1910. Serial No. 550,729.

*To all whom it may concern:*

Be it known that I, MAURICE TILHET, a citizen of the Republic of France, and resident of 31 Rue Boissy-d'Anglas, Paris, Seine, France, have invented a Variable-Speed Pedal-Gear for Cycles, Motocycles, &c., of which the following is a specification.

This invention relates to a variable speed-gear applicable to cycles, motocycles, etc., which permits of changing from one speed to another by merely actuating the pedal, without the aid of any other exterior device (such as levers, cranks, rods, etc.)

A pedal-gear constructed in accordance with this invention is shown in the accompanying drawings in which—

Figure 1:
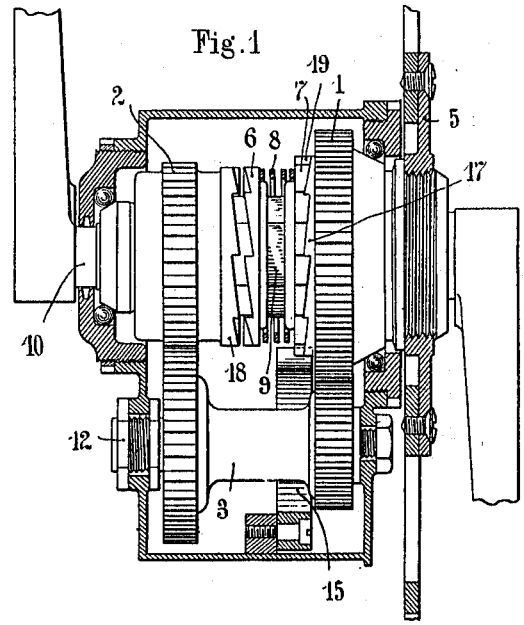
Figure 2:
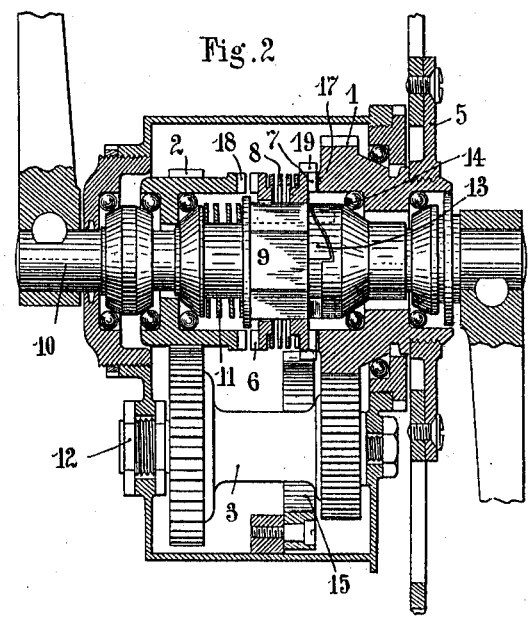
Figure 3:
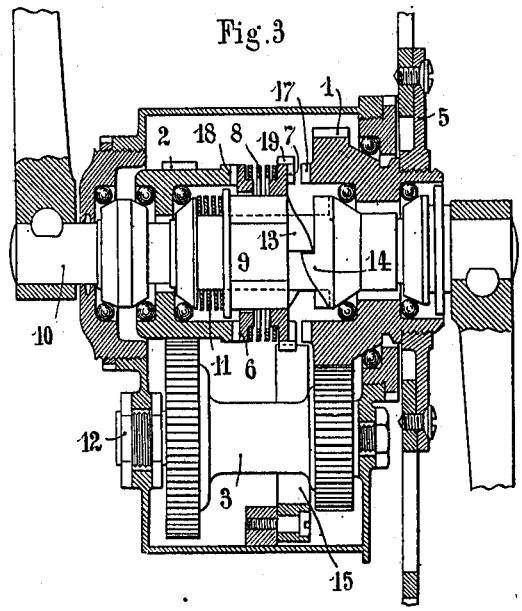
Figure 4:
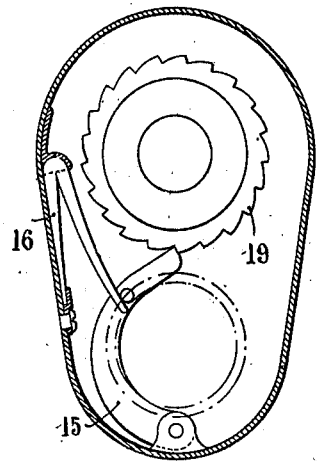
Figure 5:
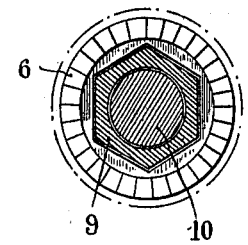

Figure 1 is an exterior view of the driving parts, the pedal-box being cut away, showing the position of the gears for high speed; Fig. 2 is a section of the same through the axes,—position for high speed; Fig. 3 is a section through the axes,—position for slow speed; Fig. 4 is a cross-section showing the stop-pawl and its safety-spring; Fig. 5 is a section through the socket 9.

The essential parts of the device comprise two gears 1 and 2, mounted on ball-bearings upon the shaft carrying the cranks and pedals; these two gears are independent of each other.

The gear 1 has on its inner face a ratchet-wheel 17, and symmetrically the gear 2 has also on its inner face a ratchet wheel 18. A double gearing 3 is likewise mounted in ball-bearings upon an intermediate axis 12. A chain-wheel 5 is secured upon and adapted to turn with the gear 1.

Driving ratchet-wheels 6 and 7 are mounted between the gears 1 and 2 and can be displaced laterally with a socket 9 upon which they are mounted having six sides. The ratchet-wheel 6 may be moved sidewise along the sides of the socket 9, whereas the ratchet-wheel 7 is blocked on same; a spring 8 maintains the distance between the ratchet-wheels 6 and 7. The socket 9 slides upon a cylindrical bearing of the pedal-gear. This socket is provided with two helicoidal planes 13. Four helicoidal planes or clutch teeth 14 form one part with the axis 10 and corresponding to the clutch teeth 13. Two of the teeth 14 have the same depth as the teeth 13; the other two have only about half of this depth. A spring 11 presses the socket 9 constantly against the planes 14. A pawl 15 prevents backward movement of the ratchet-wheel 7 when back-pedaling. To this end, the ratchet-wheel 7 is provided with exterior teeth 19. A safety-spring 16 maintains the pawl 15 in position, but may bend momentarily without any considerable effort, and so prevent breaking the gears.

Operation: We will suppose that the arrangement is in action as shown in Fig. 1. The ratchet-wheel 7 is in contact with the ratchet-wheel 17 of the gear 1. The gear 1 therefore turns with the pedal shaft, whereas the gear 2 is loose upon the said shaft. The movement of the pedals is transmitted directly to the chain-wheel and at the same speed, the gearings 3 turning loosely without having any effect. We have here high speed. If, on the contrary, we suppose the device to be arranged as in Fig. 3, that is to say the ratchet-wheel 6 being in contact with the ratchet-wheel 18 of the gear 2; in this case, the rotation of the axis 10 drives the gear 2 directly which transmits the movement to the gear 1 through the intermediary of the double gearing 3 the pinions of which are so calculated as to reduce the speed transmitted to the gear 1, and consequently to the chain-wheel. We now have slow speed. In order to pass from one position to the other, it is only necessary to effect by means of the pedals a rotary backward movement ($\frac{1}{4}$ of a revolution). We will suppose, for instance, that it is desired to pass from the position shown in Fig. 1 to the position in Fig. 3 (that is to say from high speed to slow speed), by back-pedaling the tooth 14 pushes the plane 13 of the socket 9 backward and crosses this tooth. At this moment, under the action of the spring 11, the tooth 13 falls in the notch formed by 14, and the transmission devices take the position shown in Fig. 3. During the movement which has just been described, the ratchet-wheel 7 has left the ratchet-wheel 17 of the gear 1, and the ratchet-wheel 6 has come into engagement with the ratchet-wheel 18 of the gear 2. During the back-pedaling, the socket 9 must not follow the movement of the shaft; that is why the pawl 15 is in constant engagement with the teeth 19 of the ratchet-wheel 7. The spring 16 maintains the pawl 15 in this position.

What I claim is:

1. In a change speed gear of the character described, the combination with a crank and pedal shaft, of two gear wheels 1 and 2 loosely mounted thereon, a second shaft arranged parallel with the crank-shaft, two gear wheels on the said second shaft meshing with the gear wheels 1 and 2 on the crank-shaft, a chain wheel carried by the gear wheel 1, ratchet wheels carried by the opposing faces of the gear wheels 1 and 2, laterally-shiftable ratchet wheels 6 and 7 arranged intermediate the gear wheels 1 and 2 and adapted to alternately engage with the ratchet wheels on the gear wheels 1 and 2, and means intermediate the crank-shaft and said shiftable ratchet wheels whereby partial backward rotation of the crank-shaft will effect the shifting of the last-mentioned ratchet wheels for the purposes set forth.

2. In a change speed gear of the character described, the combination with a crank and pedal shaft, of two gear wheels 1 and 2 loosely mounted thereon, a second shaft arranged parallel with the crank-shaft, two gear wheels on the said second shaft meshing with the gear wheels 1 and 2, a chain wheel carried by the gear wheel 1, ratchet wheels carried by the opposing faces of the gear wheels 1 and 2, laterally-shiftable ratchet wheels 6 and 7 arranged intermediate the gear wheels 1 and 2 and adapted to alternately engage with the ratchet wheels on the gear wheels 1 and 2, a spring-pressed slidably-arranged socket to which the ratchet wheel 7 is rigidly secured and upon which the ratchet wheel 6 is slidably mounted, said socket having clutch teeth at one end, clutch teeth on the crank-shaft adapted to engage the teeth on the socket and having different depths, as described, a spring arranged intermediate of and bearing upon the ratchet wheels 6 and 7, and a pawl engaging teeth on the ratchet wheel 7 to prevent backward rotation of the same and the socket.

In testimony whereof I affix my signature in presence of two witnesses.

MAURICE TILHET.

Witnesses:
H. C. COXE,
VICTOR MATRAU.

---

Copies of this patent may be obtained for five cents each, by addressing the "Commissioner of Patents, Washington, D. C."